United States Patent [19]

Blanchier

[11] 4,057,783
[45] Nov. 8, 1977

[54] DEVICE FOR TRANSMITTING THE CONDITION OF A SWITCH BETWEEN TWO PARTS IN RELATIVE ROTARY MOVEMENT

[75] Inventor: Jean-Claude Blanchier, Orsay, France

[73] Assignee: Jaeger, Lavallois Perret, France

[21] Appl. No.: 714,283

[22] Filed: Aug. 13, 1976

Related U.S. Application Data

[62] Division of Ser. No. 519,271, Oct. 30, 1974, Pat. No. 3,990,041.

[30] Foreign Application Priority Data

Nov. 7, 1973   France ................................. 73.39588
June 28, 1974   France ................................. 74.22741

[51] Int. Cl.² ............................................ B60C 23/02
[52] U.S. Cl. .................................... 340/58; 73/146.5; 200/61.25; 340/271
[58] Field of Search ............. 340/58, 170, 195, 258 C, 340/271; 324/167, 168, 179; 307/9, 10 R, 118, 232; 200/61.22, 61.25; 73/146.4, 146.5

[56] References Cited

U.S. PATENT DOCUMENTS

| | | | |
|---|---|---|---|
| 3,602,884 | 8/1971 | Brumbelow | 340/58 |
| 3,614,732 | 10/1971 | Lejeune | 340/58 |
| 3,665,387 | 5/1972 | Enabnit | 340/58 |
| 3,911,434 | 10/1975 | Cook | 343/6.5 R |
| 3,922,639 | 11/1975 | Shimahara et al. | 340/52 F |
| 4,006,449 | 2/1977 | Sumi | 340/58 |

Primary Examiner—John W. Caldwell, Sr.
Assistant Examiner—Joseph E. Nowicki
Attorney, Agent, or Firm—Donald D. Jeffery

[57] ABSTRACT

A device for transmitting the condition of a switch comprising a first assembly consisting of a switch, a first pair of coils serially connected when the switch is closed, and a second assembly consisting of a second pair of coils, magnetically coupled to each other. A first coil of the second pair generates an alternating magnetic field. A detector is coupled to the second coil of the second pair for producing different outputs respectively when the second coil of the second pair is excited only from the field of the first coil of the second pair and when the second coil of the second pair is also excited from the second coil of the first pair.

10 Claims, 12 Drawing Figures

DEVICE FOR TRANSMITTING THE CONDITION OF A SWITCH BETWEEN TWO PARTS IN RELATIVE ROTARY MOVEMENT

This is a division of application Ser. No. 519,271, filed Oct. 30, 1974 now U.S. Pat. No. 3,990,041.

BACKGROUND OF THE INVENTION

The invention relates to means which enables a signal to be given whether electric contacts between two parts in relative rotary movement are open or closed; it is of particular use in an automobile to indicate that a limiting value has been reached by a parameter related to the behavior of its tires in such a way as to activate a sound and/or light wavering device provided for this purpose in the interior of the said vehicle.

Devices of this type have already been proposed, particularly for detecting an abnormal drop in the pressure in a tire. In such devices a pressure contact connected to the valve of the tire being monitored is in series in the circuit of a coil which is movable with the wheel of the vehicle and thus passes at regular intervals in front of two devices mounted facing the said coil on the chassis of the vehicle, the first device inducing in the mobile coil a current which is then coupled to the second or receiving device. The position of the pressure contact changes when the pressure inside the tire reaches a predetermined minimum value, thereby bringing about the presence or absence of the current induced by the mobile coil in the receiving device. The receiving device then processes the information thus provided and translates it so that it can be used by alarm means.

Different solutions have been proposed for the receiving device. One of these solutions is the use of an oscillatory circuit whose oscillations depend upon the current induced by the mobile coil. The inconvenient aspects of such an arrangement result from the severe envirement in which it is implanted. The mobile coil which should be linked to the movement of the wheel is in fact fixed either on the rim or on the moving part of the braking system; this means that the fixed devices can only be implanted on or near the fixed parts of the brakes. It will be realized that situated here the electronic circuits must be subjected to exceedingly high temperatures (which can exceed 500° C) which causes them to deteriorate rapidly. Another solution therefore also uses coils for said first and second devices so as to bring only the transmitting and receiving coils close to the mobile coil; the electronic circuits to which they are connected can be in a less exposed part of the vehicle. A known device of this type comprises a mobile coil wound on the rotating part of the braking system and working in co-operation with two fixed coils, one of which is a transmitter, the other a receiver, mounted on a part of the vehicle chassis and diametrically opposed with regard to the circumference defined by the mobile coil; the diameter being great enough to prevent all disturbing interaction of the transmitting coil on the receiving coil. It will be realised that it is awkward to mount such a device, and is in fact only practisable if done originally on a new vehicle. Any necessary repairs to the coils also present difficulties.

SUMMARY OF THE INVENTION

One object of the invention is to produce the least cumbersome device possible which is capable of being fixed very easily into a vehicle.

According to the invention the only parts of the device mounted near the wheel are a mobile first assembly consisting of a pressure contact and two coils mounted in series, and a second assembly, integral with a fixed part of the vehicle chassis and consisting of a transmitting coil and at least one receiving coil arranged alongside each other so that a current is induced in the receiving coil(s) by the transmitting coil. The first assembly is mounted on the wheel of the vehicle so that it periodically moves opposite the second assembly.

In one embodiment of the invention the fixed assembly comprises two receiving coils mounted in phase opposition, the output signal from these coils together with that transmitted by all the other monitoring devices existing on the vehicle is sent over a single electronic circuit consisting of an operational amplifier, receiving the signal via its inverting input, its output being connected at the same time to the control circuit for the warning means and to the input of a counter having $n$ positions ($n$ being equal to the number of wheels on the vehicle in question) which is itself followed by a decoder of which each of the $n$ outputs controls the transmitting circuit forming part of the fixed assembly mounted on the corresponding type.

BRIEF DESCRIPTION OF THE DRAWINGS

The invention may be carried into practice in various ways, and certain embodiments will now be described by way of example, with reference to the accompanying drawings, in which.

DETAILED DESCRIPTION OF ILLUSTRATIVE EMBODIMENTS

Figures 1, 2:
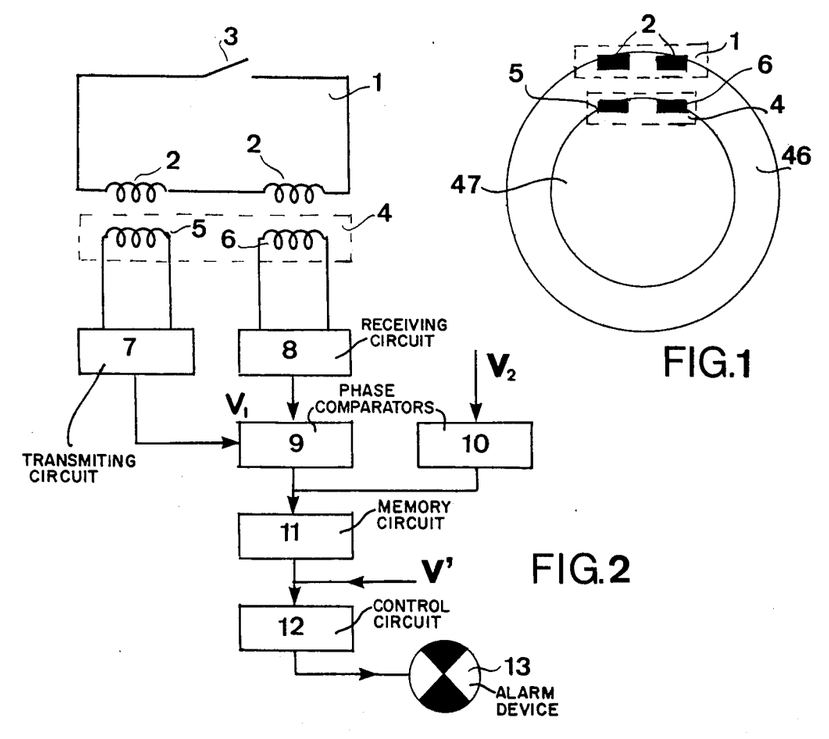
FIG. 1 is the mounting of the device on a wheel of the vehicles.
FIG. 2 is a synoptic diagram of a first embodiment of the invention.

The warning device comprises (FIGS. 1 and 2), according to one embodiment, a first assembly 1, integral with the wheel 46 of the vehicle and composed of two coupling coils 2 in series with a pressure contact 3 which opens when the pressure inside the tire being monitored reaches a predetermined lower limit. The assembly 1 is therefore movable with the vehicle wheel and co-operates with a fixed assembly 4 mounted for example on the brake shoes, and comprising a transmitting coil 5 and a receiving coil 6, arranged in such a way that the mobile coils 2 are periodically positioned opposite the fixed coils 5 and 6. The transmitting coil 5 is connected to an electronic transmitting circuit 7, while the receiving coil 6 is followed by a receiving circuit 8 associated with a phase comparator 9 into which a signal from the transmitting circuit 7 is passed. These three circuits constitute the monitoring means $V_1$ of one of the tires of the vehicle, which means are connected with the same monitoring means $V_2$ of a second tire at the output of the phase comparator 10 of the latter. The signal produced by the two circuits $V_1$ and $V_2$ is then sent via a memory circuit 11 which is connected to the control circuit 12 of the warning device 13, the said control device also receiving output signals such as V' from memorising circuits similar to 11, monitoring, two by two, the other tires of the vehicle in question. These circuits are, in general, two in number, but can be more numerous if the device is fitted to a truck with many wheels.

Figure 7:
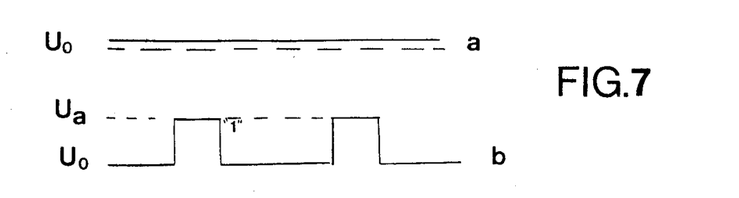
FIG. 7 shows the output signals from the phase comparator.

The apparatus functions as follows: the transmitter 7 constantly supplies the transmitting coil 5. The mobile coils 2 are alternately present and absent at the position in which they are respectively aligned with the receiving coil 6 and the transmitting coil 5. When they are absent there is nevertheless, a certain magnetic coupling between the transmitting and receiving coils. The transmitting coil 5 thus induces a certain current in the receiving coil 6. The signal received is in phase with the transmitting signal. The comparator 9 which compares the phase of the signal received with regard to that of the signal transmitted then sends out a logical signal at level "0." The pressure contact 3 opens when the pressure inside the tire being monitored drops below the predetermined value; in this case the passage of the connecting coils 2 in front of the fixed assembly 4 will obviously have no effect on the signal transmitted by the receiver 8 and the comparator will still send out an output signal of level "0." The coils are so wound that, if the tire pressure is high enough, and the pressure contact is closed, when the assembly 1 passes the coils 5 and 6, the received and transmitted signals are no longer in phase and the compartor will send out a logical signal of level "1." To summarize, when the pressure contact is open, that is to say when the pressure is abnormally low inside the tire, the phase comparator 9 sends out a continuous logical "0" signal (FIG. 7a); when the pressure contact is closed the comparator 9 sends out a square wave signal of which every mark of level "1" corresponds to the alignment proximity of the mobile and fixed coils (FIG. 7b). The memory circuit 11 which receives the signals transmitted by the phase comparators 9 and 10 is arranged so that when these two circuits simultaneously transmit square wave signals, one of these circuits cancels the effect of the other and vice versa; when at a given moment one of these circuits ceases to transmit a square wave signal, a sign that the tlre which it monitors is deflated, it no longer cancels the effect of the other and the control circuit 12 of the warning means 13 will be unblocked.

Figure 3:
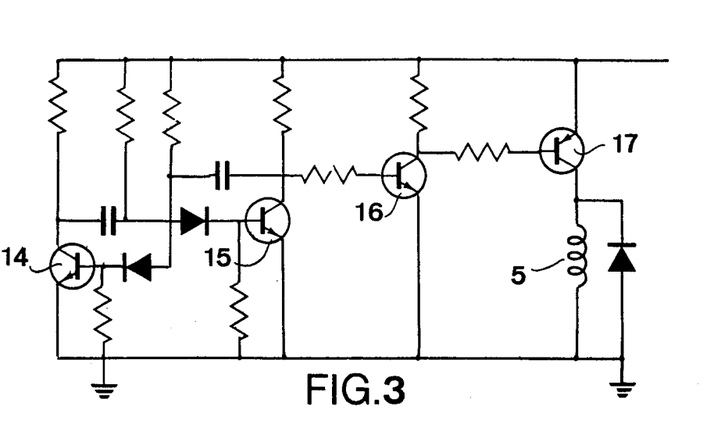
FIG. 3 is a diagram of the transmitting circuit.

FIG. 3 shows an embodiment of the transmitting circuit 7. The transistors 14 and 15 form an astable multi-vibrator which sends out square wave signals of a frequency $f_o$ (equal to 10,000 Hz for example). The transistors 16 and 17 amplifying that signal and apply it to the transmitting coil 5. Other transmitters capable of supplying the transmitting coil 5 with square or sinusoidal signals could be used.

Figure 4:
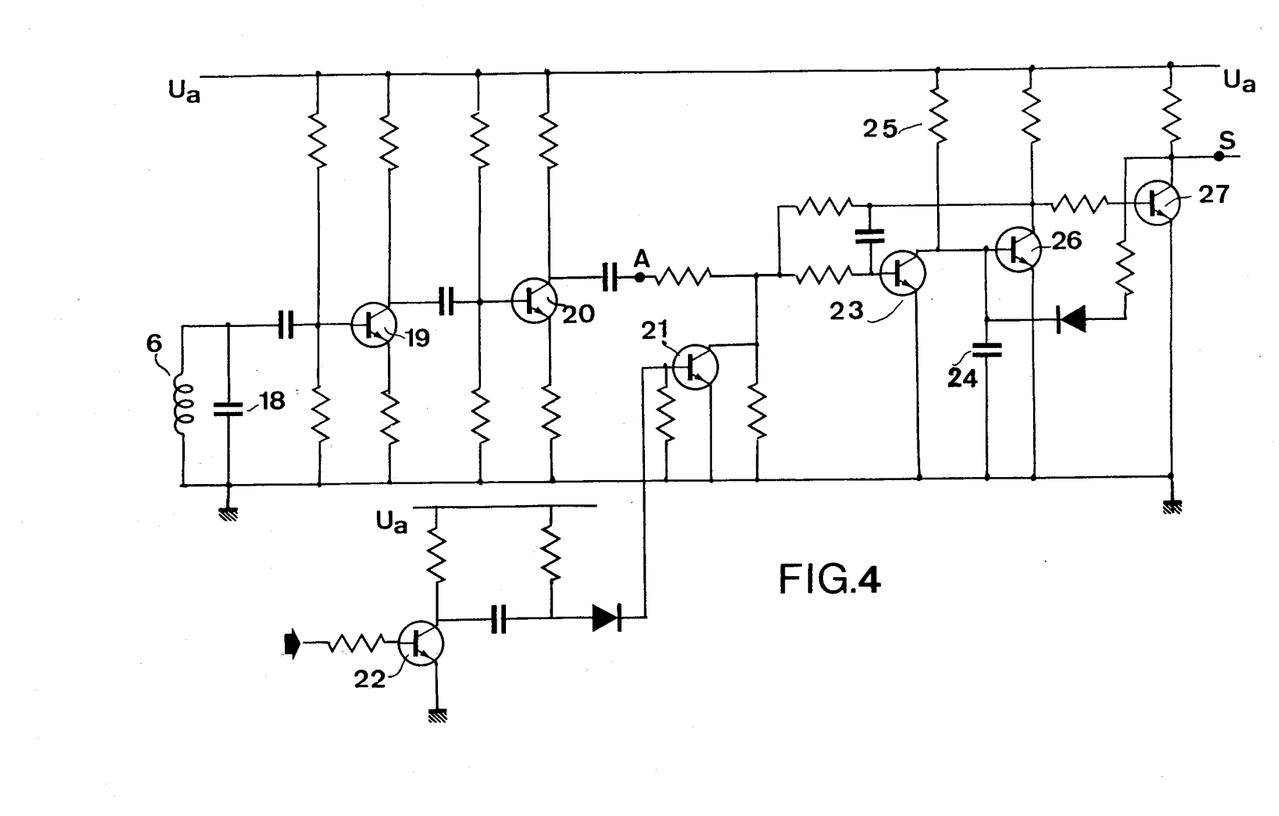
FIG. 4 is a diagram of the receiving circuit and phase comparator.
Figure 5:
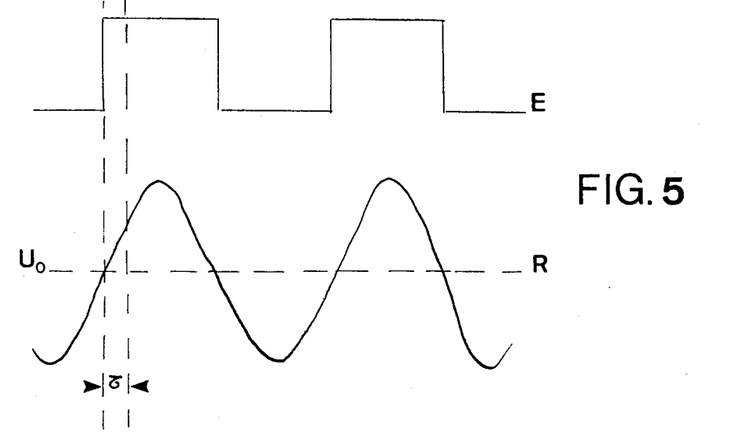
FIGS. 5 and 6 show the transmitting and receiving signals.
Figure 6:
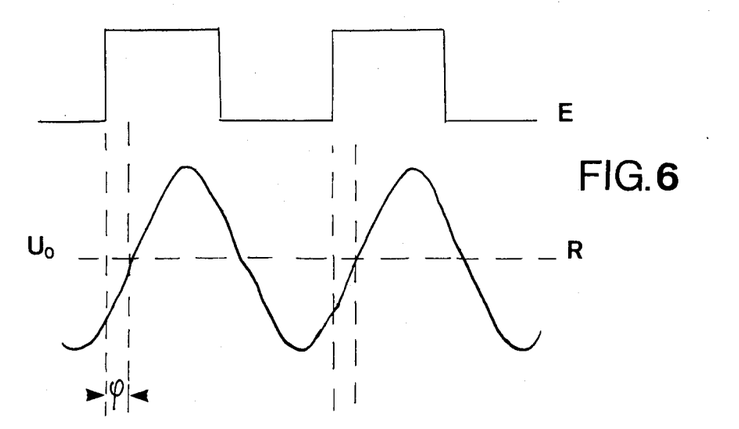

FIG. 4 shows the receiving circuit 8 associated with the phase comparator 9. The receiving coil 6 is tuned in parallel resonance with the capacitor 18 to a frequency $f_r$ which is lower than $f_o$, the transmitting frequency. In these conditions a sinusoidal voltage develops at its terminals at a frequency of $f_o$, in phase with the transmitting voltage as shown in FIG. 5, its amplitude depending upon the mutual coupling between the transmitting coil and the receiving coil, upon the current passing through the transmitting coil, and upon the relative variation in frequency $(f_o - f_r/f_r$. The received signal is ampliied by the two cascaded stages using the transistors 19 and 20. The transistor 21 is normally saturated but is cut-off during a time $\tau$ following each leading edge of the transmitted signal supplied by the transistor 22. During this space of time the signal present at the collector of the transistor 20, that is to say at point A, output of the receiving circuit, is applied to the base of the transistor 23. When the mobile assembly 1 is not in the vicinity of the fixed coils 5 and 6 the received signal is in phase with the transmitted signal. Therefore at point A, during the time in which the transistor 21 cuts-off, a positive voltage corresponding to the beginning of the positive half-period of the received signal occurs. The transistor 23 then becomes saturated and discharges the capacitor 24. Between two successive periods $\tau$ the capacitor 24 is charged through the resistor 25, since outside the time $\tau$ the transistor 23 is held cut-off by the saturated transistor 21. The time constant $R_{25} C_{24}$ is such that the voltage at the terminals of the capacitor 24 does not have time between two successive periods $\tau$ to reach the conduction threshold of the transistor 26, this latter therefore remains cut-off, the supply voltage $U_a$ is applied to the base of the transistor 27 which is thus saturated and a voltage of logical level "0" is present at the output S of the comparator. When the mobile coils 2 are in the presence of the fixed coils 5 and 6 the received signal is then out of phase by an angle of $\psi$ with regard to the transmission signal, as shown in FIG. 6. The smaller the distance between the mobile coils and the fixed coils. The greater this angle $\psi$ will be. At point A (FIG. 4) during the time $\tau$ in which the transistor is cut-off, a negative voltage occurs which corresponds to the end of the negative half-period of the received signal. The transistor 23 therefore remains cut-off and the capacitor 24 has time to change the transistor 26 becomes saturated, cutting-off the transistor 27 so that the supply voltage $U_a$ which corresponds to the logical level "1" is present at the point S. When the pressure contact is closed a square wave signal (FIG. 7b) is therefore obtained at the output S of the comparator this signal corresponding to a state of normal pressure in the monitored tire. If on the other hand the pressure contact is open, that is to say if the pressure inside the tire has reached its alarm threshold, the coupling coils 2 no longer introduce a phase shift in the receiving circuit and the output S of the comparator will still be at the logical level "0" (FIG. 7a).

Impulses produced at the output of transistor 26 of the comparator are sent simultaneously (FIG. 8) over the base of the transistor 27 which contains the capacitor 28 in its emitter and collector, the said capacitor constituting the memory device 11 associated with the circuit in question ($V_1$), and over the base of the transistor 29 which contains the capacitor $28_R$ in its emitter and collector, the said capacitor being identical to the capacitor 28 and constituting the memory device $11_R$ of the second circuit ($V_2$ or $V_R$). The said second circuit comprises, in identical manner, a transistor $27_R$, identical to the transistor 27, over the base of which is sent the impulse from the detector circuit 55, and a transistor $29_R$, identical to 29 and receiving the same impulse as the transistor $27_R$.

Figure 8:
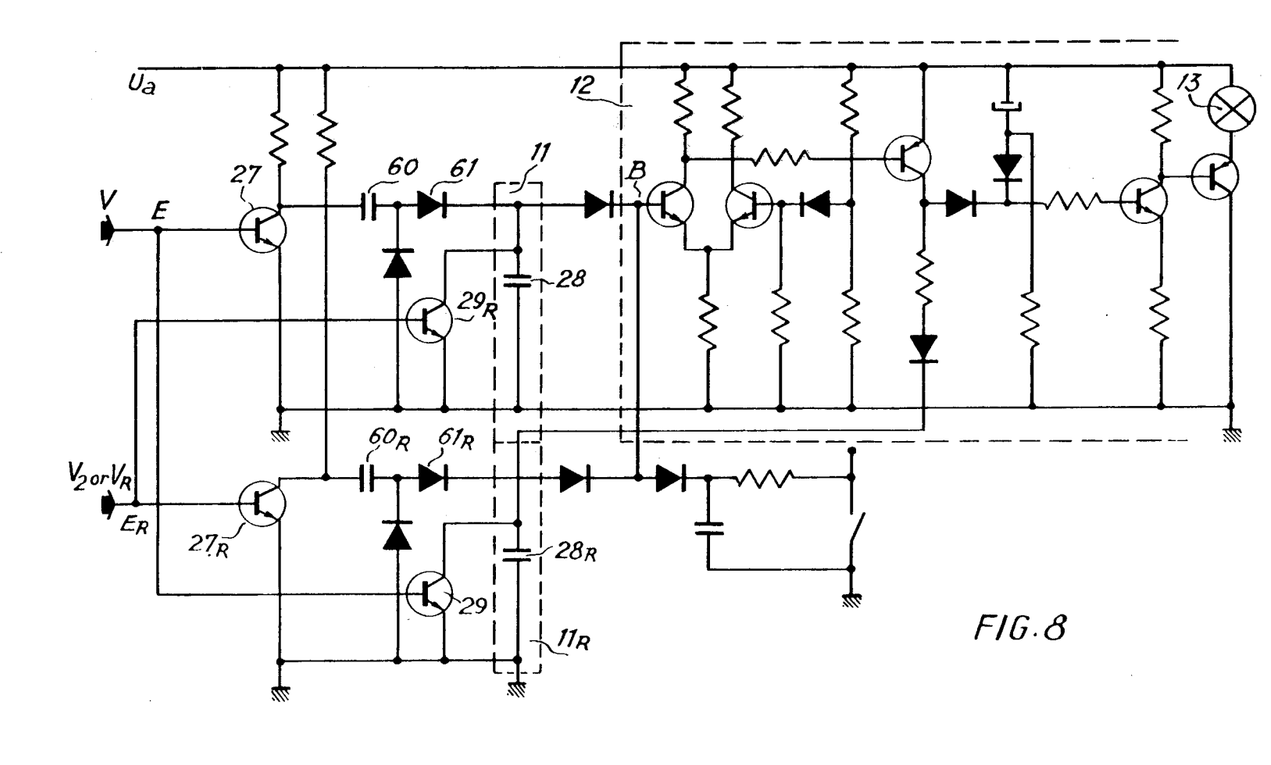
FIG. 8 is a diagram of the memory and alarm control circuits.

When an impulse appears on the base of the transistor 27, the latter saturates and discharges the capacitor 60 while the capacitor 28 remains charged or discharged as a result of the interposition of the diode 61. In the same way and at the same time the impulse satuates the transistor 29 which discharges the capacitor $28_R$ of the second circuit. When the trailing edge of the impulse appears, the transistor 27 cuts off by means of it collector resistor and charges the capacitor with the supply voltage Ua. Symmetrically each impulse appearing on the second circuit enables the transistor $29_R$ to discharge the capacitor 28 and the transistor $27_R$ to charge the capacitor $28_R$.

When pressure is normal in the tires, the two circuits both supply a square wave signal, the capacitors 28 and $28_R$ are alternately charged and discharged and no voltage can occur over the input B of the control circuit 12 of the alarm means 13. When on the other hand one of the circuits, the second one for example, ceases to receive impulses because the tire associated with this circuit is deflated, the signals received over the first circuit charge the capacitor 28 which can no longer be discharged by the transistor $29_R$, and the voltage increases progressively at B up to the threshold of activating the differential amplifier which constitutes the control circuit 12 for the alarm means 13, thus permitting the said means into operation. If it is the first circit which no longer receives impulses, indicating that one of the tires monitored by scanning is deflated, the process described above is reproduced but it is the capacitor $28_R$ which is charged since it can no longer be dicharged by the transistor 29.

An attached device, comprising a contact 30 which changes position when the reverse gear of the vehicle is engaged enables the input of the control circuit 12 to be blocked, whatever the signals sent out by the monitoring circuits may be, so as to avoid inopportune actuation of the alarm during the maneuvering of the vehicle. The circuit as described benefits from a positive security, it enables, in fact, actuation of the alarm device when one of its elements is defective : breaking the circuit of the connecting coils obviously produces the same effect as opening the pressure contact and therefore actuates the alarm means. The actuation is equally brought about when the transmitting or receiving coils are broken or the electronic circuits upstream of the memorisation circuit 11 break down; in fact in this case the voltage sent out by the defective circuit is of level "0." At this moment a simple check on the condition of the tires enables one to conclude that the device has broken down. On the other hand, in the event of prolonged stopping of the vehicle, the device being live, if the mobile coils are outside the field of action of the fixed coils on two circuits, both the latter will send out a zero voltage. The memory capacitor 28, not charged, will not be capable of actuating the control circuit of the alarm means; if the mobile coils are in the presence of the fixed coils on one of the circuits, it has been seen above that the value of the charge of the capacitor 28 necessary for the actuation of the control circuit 12 is only reached after a fixed number of impulses, the latter will not be reached in this case since the vehicle is stationary.

Figure 9:
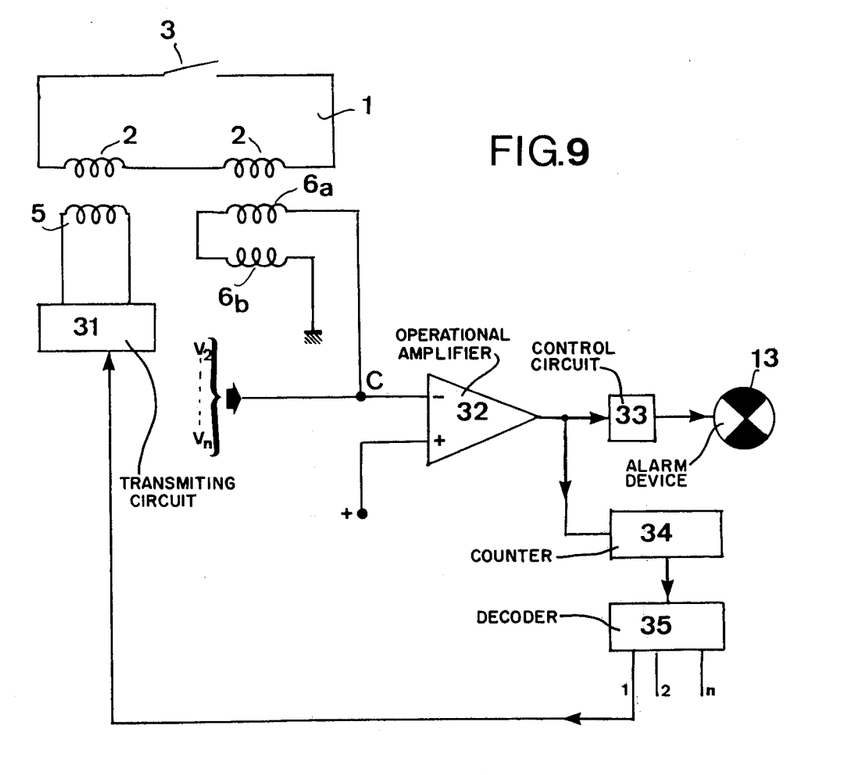
FIG. 9 is a synoptic diagram of a second embodiment of the invention.
Figure 10:
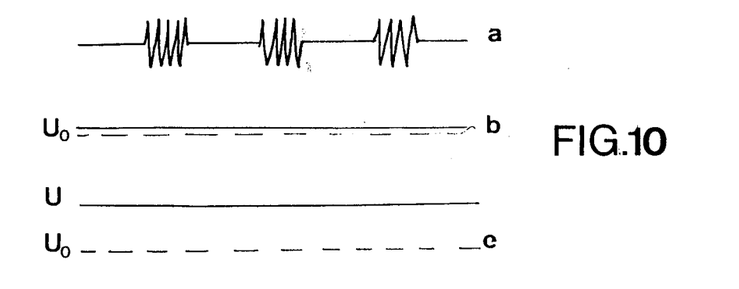
FIG. 10 shows the receiving signals concerning this second embodiment.

A second embodiment of the device according to the invention is shown in FIG. 9. The mobile assembly 1 is similar to that in the preceding case. The fixed assembly comprises a transmitting coil 5 connected to a transmitting circuit 31 and a receiving coil consisting of 2 coils 6a and 6b, connected in series and in antiphase. In the absence of the coupling coils 2 the transmitting coil 5 induces the same signal in the two receiving coils 6a and 6b but as these are in antiphase no signal is present at the input C of the receiving circuit (FIG. 10b). In the presence of the coupling coils so long as the mobile circuit is closed by the pressure contact 3 an alternating signal occurs at the output C of the receiving circuit (FIG. 10a).

In the embodiment shown, the transmitting coil 5 is not permanently supplied, the functioning of the transmitting circuit 31 is in fact controlled from the output of the receiving circuit so as to produce a continuous scanning of the different circuits monitoring the tires of the vehicle from one sole circuit for receiving signals and controlling the alarm means. This arrangement enables both a simplification of the electronic design and decrease in the overall power consumption due to the intermittent functioning of each of the transmitters. It is however possible to install in addition to the coils arranged as described above, an electronic circuit similar to that shown in the first embodiment and permitting separate operation of each circuit fitted to the vehicle. Conversely the system of monitoring by periodical scanning of the circuits can be used with the aid of certain adaptations in the first embodiment described.

The signal received by each pair of receiving coils is supplied to the inverting input of an operational amplifier 32 whose output is connected both to the control circuit 33 of the alarm means 13 and to a counter with n positions 34, n being the number of tires to be monitored in the vehicle in question, itself followed by a decoder 35 having n outputs, each of which is connected to the transmitting circuit 31 of the corresponding circuit.

Figure 11:
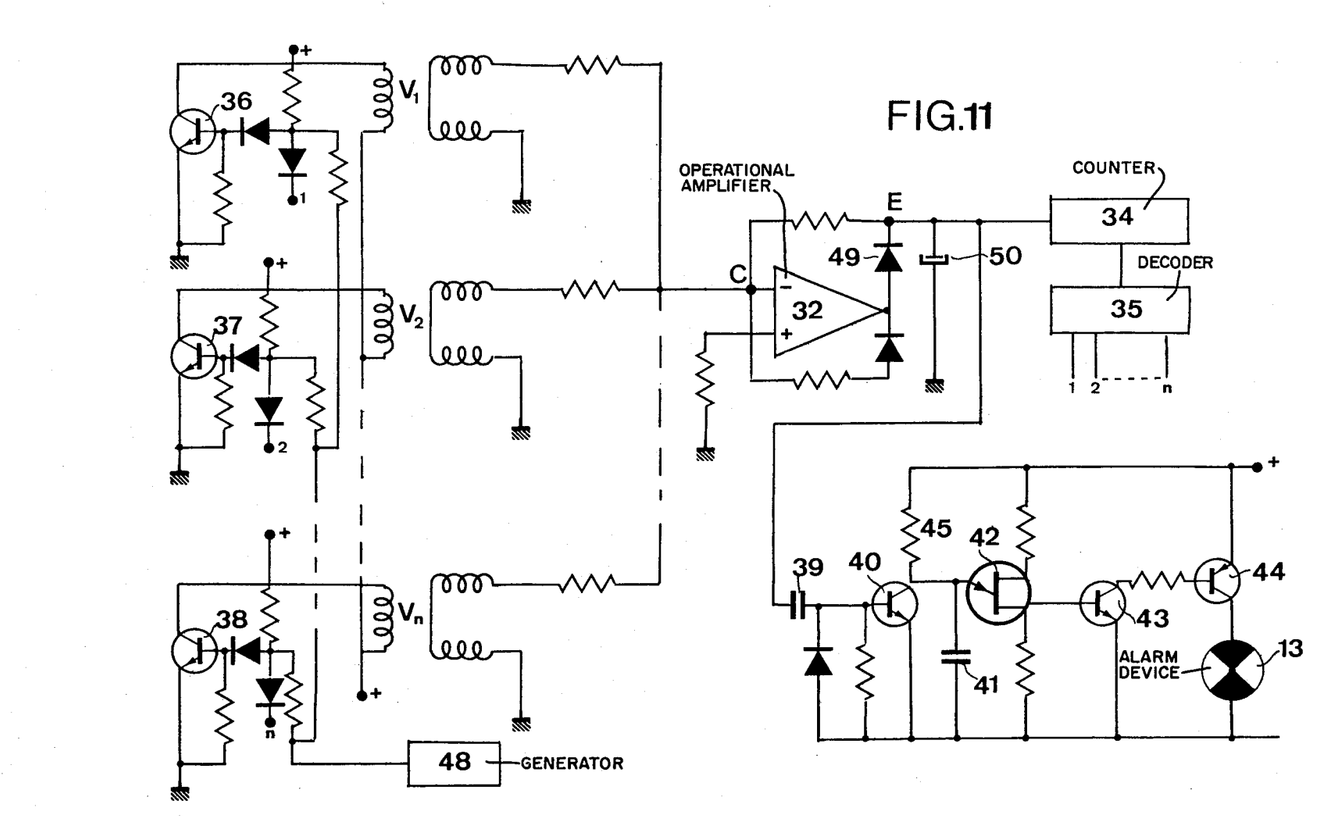
FIG. 11 is a diagram of the device.

Let us imagine (FIG. 11) the transmitting coil of circuit $V_1$ supplied with square wave signals by the transistor 36 and the generator 48. When the mobile coils pass in front of the fixed coils, the pressure contact being closed, an alternating signal which results is supplied to the inverting input of the operational amplifier 32. The resulting alternating signal at the output of the amplifier 32 is rectified by the diode 49, and filtered by the capacitor 50 to provide a positive signal which causes the transistor 40 to saturate and consequently discharge the capacitor 41. The transistors 43 and 44 do not conduct and the alarm 13 is switched off. The impulse which appeared at the output E of the amplifier 32 is supplied to the counter 34 which steps so that the decoder 35 places a logical condition "1" on its output 2, the other outputs being at "0." The transistor 37 pertaining to the transmitting circuit of the circuit $V_2$ receives the logical "1" signal on its base and permits the passage of the square wave signals sent out by the oscillator 48 to its transmitting coil while the transistor 36 which is cut-off ceases to supply its associated transmitting coil. If the tire corresponding to the circuit $V_2$ has normal pressure a new impulse will occur at E and the process described above will be reproduced, then one goes on to explore circuit $V_3$ etc. . . . But if the said tire has sufficiently low pressure to open the pressure contact in the mobile circuit 1 the receiving coil will not produce any signal and no impulse will occur at E, the transistor 40 remains cut-off and the capacitor 41 is charged through the resistance 45 up to the peak voltage of the unijunction transistor which then fires switching on the transistors 43 and 44 and so energizing the alarm means 13. The time constant $R_{45}C_{41}$ is such that if no tires are defective, the peak point voltage of the unijunction 42 is reached only if the speed of the vehicle is very low (less than 1 km/h, for example). In this embodiment it can be seen, in fact, that the alarm means is automatically energized when the vehicle is stationary. This makes it possible to check that it is functioning properly. This device also fails safe in the event of a breakdown of certain of its component parts. A break in any one of the coils will cause a zero voltage to occur at the output of the receiver coil and allows the alarm means to be energized.

A third possible embodiment of the invention allows an increase in the signal received by approximately 100% by comparison with those described above in this application. It also proposes a method of using the said signal so that, in contradistinction to that shown in FIG. 11, the alarm is not automatically activated when the vehicle is stationary.

The device comprises a fixed assembly consisting of a transmitting coil and two receiving coils arranged symmetrically on either side of the transmitting coil and connected in anti-phase. These three coils work in conjunction with three movable coupling coils whose positions correspond to those of the fixed coils, the respective directions in which the movable coils are wound and/or their connections being such that when the pressure contact, in series with these coils, is closed, the coils produce an increase in the electromotive force induced in one of the two receiving coils and, by correlation, a reduction in the electromotive force in the other.

The device according to the third embodiment comprises (FIG. 12) a movable assembly 149 consisting of a pressure contact 3 which opens when the pressure inside the tire being monitored reaches a predetermined lower limit and of three coils 150, 151, 152 arranged in line. The fixed assembly comprises a transmitting coil 5 coupled to a transmitting circuit 31 and a receiving coil consisting of two coils 6a and 6b connected in antiphase and arranged in line, symmetrically on either side of the transmitting coil in such a way that the relative positions of the three fixed coils corresponds exactly to those of the movable coils. In the example chosen, the coils are aligned, however, and provided that this correspondence of positions is maintained it is possible to modify the geometric positions of the coils without in any way changing the principle of the invention. In the absence of the coupling coils, the transmitting coil 5 induces the same magnetic flow in the two receiving coils 6a and 6b, resulting in an identical electromotive force and, since the two coils are connected in antiphase, a zero difference of potential at the output. In the presence of the coupling coils 150, 151 and 152, the pressure contact 3 being closed, coupling takes place in such a way that the electromotive force decreases in one of the receiving coils, 6a for example, and increases correspondingly in the other, 6b. Thus a difference of potential occurs at the output of the device.

Figure 12:
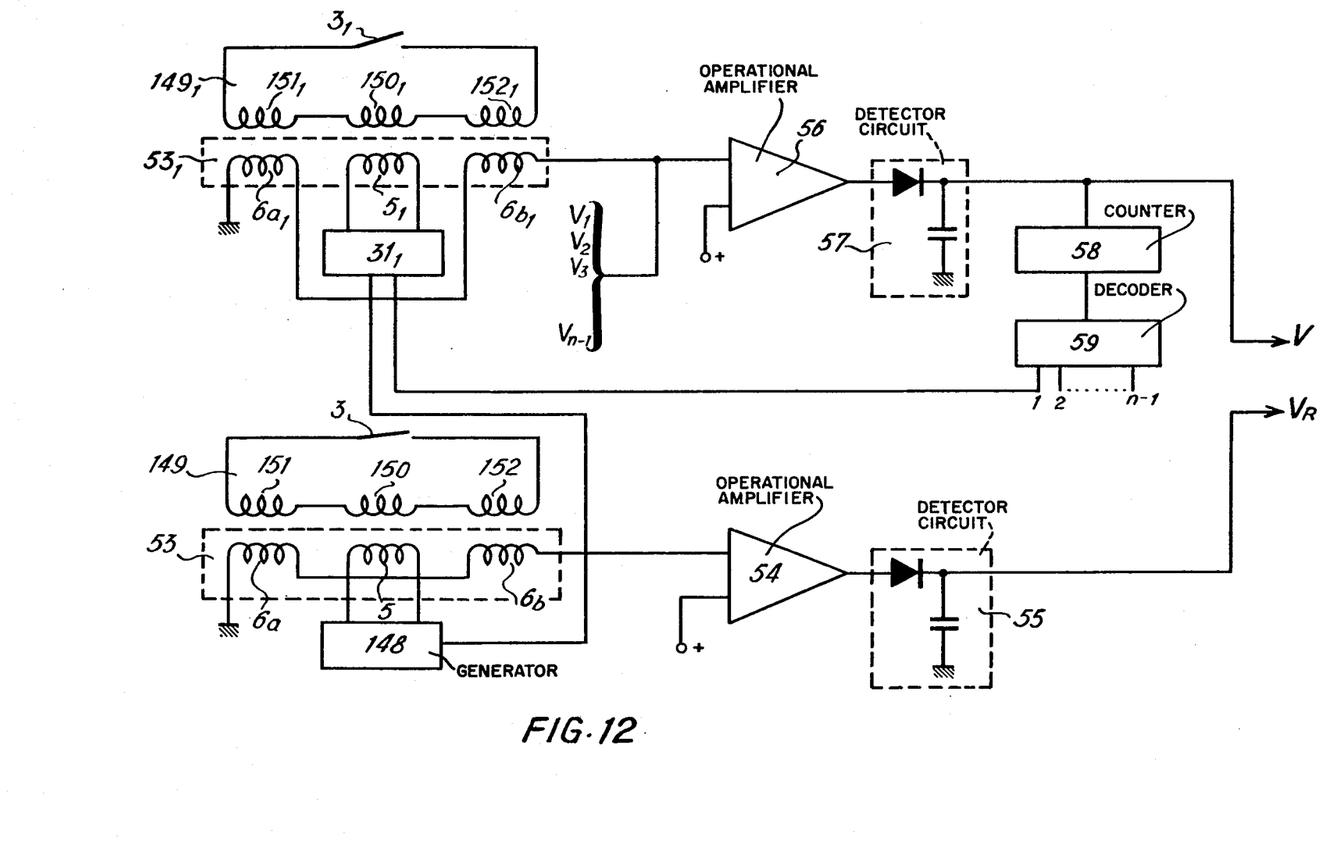
FIG. 12 is a diagram of the device according to a third embodiment.

The alternating signal thus obtained, which is approximately double that produced by the devices described in the first and second embodiments, can of course be used by means of a circuit similar to those described above. However, a circuit is described below which uses the principle of periodical scanning of the devices, as previously mentioned, with the addition of a supplementary reference circuit which, with the aid of a circuit comparing the two signals transmitted, prevents the alarm device from operating when the vehicle stops.

According to this embodiment, each of the $n$ tires of the vehicle is equipped with a movable assembly 149 and a fixed assembly 53. The transmitting coil of the ($n$ − 1) first devices is not supplied permanently : the operation of the transmitting circuit is controlled as hereinafter described in such a way that the ($n$ − 1) circuits monitoring the associated tires are scanned continuously. The $n^{th}$ device is coupled to the circuit $V_R$, its transmitting circuit is permanently supplied by the multivibrator 148 and the $n^{th}$ device has a circuit capable of making use of the received signal, the said signal being identical to but separate from that of the ($n$ − 1) other circuits. This circuit comprises an operational amplifier 54 which receives the output signal from the receiving coil over its input and which has its output connected to a detector circuit 55 which sends the formed signals over one of the inputs $E_R$ of a comparator circuit controlling the alarm means, identical to that shown in FIG. 8.

The signals transmitted by the ($n$ − 1) other circuits provided on the vehicle in question are sent over the input of another operational amplifier 56. The output signals from the latter, after they have been formed in a detector device 57 are sent simultaneously over the second input E of the comparator circuit (FIG. 8) and over a counter with ($n$ − 1) positions 58, followed by a decoder 59 each of whose ($n$ − 1) outputs is connected to the transmitting circuit 31 of the corresponding circuit for controlling the transmission thereof.

The operation of the circuits subjected to scanning is as follows: as long as the circuits which are scanned present a normal situation (pressure contact closed) a signal with be obtained at the output of the detector circuit 57 and therefore over the input E of the comparator circuit, the same signal causing the counter 58 to step. Otherwise, the control circuit for the alarm means is actuated, as explained in reference to FIG. 8. (In FIG. 8, the said second circuit is the reference circuit $V_R$).

An alternative embodiment is as follows: the $n$ tires have $n$ transmitting devices controlled respectively by $n$ outputs of the decoder, with the counter having n different states, and the n received signals are sent over the input of the operational amplifier 56. The reference device is associated to a rotary part which is moving with the vehicle, such as the output of the gearbox or the speed-meter for instance.

What is claimed is:

1. A switch-condition transmitting device comprising:
    a. a first assembly consisting of a switch and at least two coils which are serially connected when said switch is closed;
    b. a second assembly comprising at least a transmission coil and detection coil, said coils of the second assembly being magnetically coupled to each other and being positioned so that in one relative position of said assemblies the transmission coil is magnetically coupled to one coil of the first assembly while the detection coil is magnetically coupled to the other coil of the first assembly;
    c. exciting means for causing the transmission coil of the second assembly to generate an alternating magnetic field; and
    d. detecting means coupled to the detection coil of the second assembly for producing different outputs respectively when said switch is closed and when said switch is open, said detecting means comprising a phase comparator having a first input connected to said exciting means and a second input connected to said detection coil, said phase comparator providing at an output a first output signal when said switch is open and said detection coil is excited only from the field of said transmission coil, and a second output signal when said switch is closed and said detection coil is excited from said other coil of the first assembly.

2. A device as claimed in claim 1 in which the two assemblies are disposed one on each of two relatively rotatable members whereby the coils move into said one relative position once in each revolution.

3. A device as claimed in claim 2 in which the members comprise respectively a rotatable vehicle wheel and a non-rotatable member affixed to a vehicle chassis.

4. A device as claimed in claim 3 in which the wheel has a pneumatic tire and the switch is arranged to be operated when the pressure in the tire changes through a predetermined low limit.

5. A device as claimed in claim 1 wherein said phase comparator includes means for rendering said comparator operable during selected time periods for comparing the phase of signals from said exciting means and said detection coil, said selected periods being related to the phase of signals from said exciting means.

6. A device as claimed in claim 5, further including means for determining the length of said selected periods.

7. A device as claimed in claim 1, wherein said phase comparator comprises: a capacitor; means for charging said capacitor; and means for periodically discharging said capacitor during a predetermined time portion of each cycle of said alternating magnetic field when the signals at said first and second comparator inputs are in phase, and for inhibiting discharge of said capacitor when said signals are not in phase, the output of said phase comparator being dependent upon the charge in said capacitor.

8. A device as claimed in claim 7, wherein said phase comparator includes an amplification stage and said means for discharging said capacitor comprises: a transistor having said capacitor connected between its collector and emitter, said second input of the comparator being connected through said amplification stage to the base of said transistor; and means for ungrounding the base of said transistor so as to render said transistor conductive during said predetermined time, whereby discharging said capacitor, and for grounding the base of said transistor to render said transistor non-conductive outside said predetermined time, thereby permitting said charging means to charge said capacitor.

9. A device as claimed in claim 1, further comprising means for receiving the signals appearing at said phase comparator output and for receiving the signals appearing at the phase comparator output of another, similar said switch-condition transmitting device, said receiving means including means for memorizing the output signals from each said phase comparator and for providing a memory output signal when the signal received from the output of at least one said phase comparator indicates that said associated switch is open.

10. A device as claimed in claim 9, further comprising alarm means responsive to said memory output signal for indicating when at least one said switch is open.

* * * * *